United States Patent [19]

Takeshi

[11] Patent Number: 5,627,713
[45] Date of Patent: May 6, 1997

[54] PROTECTIVE DEVICE FOR ELECTRIC DISTRIBUTION SYSTEM

[75] Inventor: Masakazu Takeshi, Tokyo-to, Japan

[73] Assignee: Kabushiki Kaisha Toshiba, Kawasaki, Japan

[21] Appl. No.: 994,079

[22] Filed: Dec. 17, 1992

Related U.S. Application Data

[63] Continuation of Ser. No. 675,814, Mar. 27, 1991, abandoned.

[30] Foreign Application Priority Data

Mar. 27, 1990 [JP] Japan ................................ 2-075647

[51] Int. Cl.⁶ ............................................. H02H 3/093
[52] U.S. Cl. .................................. 361/67; 361/63; 361/97
[58] Field of Search ............................. 361/24, 31, 63, 361/67, 87, 93, 94, 103, 95–97; 364/483; 324/121 R, 158 MG

[56] References Cited

U.S. PATENT DOCUMENTS

| | | | |
|---|---|---|---|
| 4,319,298 | 3/1982 | Davis | 361/24 |
| 4,432,031 | 2/1984 | Premerland | 361/94 |
| 4,525,763 | 6/1985 | Hardy | 361/24 |
| 4,527,214 | 7/1985 | Hattori | 361/94 |
| 4,630,270 | 12/1986 | Petit et al. | 364/483 |
| 4,797,936 | 1/1989 | Nakatsugawa et al. | 324/121 R |
| 4,952,852 | 8/1990 | Bando | 361/31 |
| 5,019,760 | 5/1991 | Chu et al. | 324/158 MG |

*Primary Examiner*—Peter S. Wong
*Assistant Examiner*—Adolf Berhane
*Attorney, Agent, or Firm*—Oblon, Spivak, McClelland, Maier & Neustadt, P.C.

[57] ABSTRACT

A protective device for an electric distribution system capable of providing an easy inspection and confirmation of the setting for the operation characteristics of the device. The device includes an input unit for entering a setting of an operation characteristic of the protective device; a calculation unit for determining the operation characteristic of the protective device according to the setting entered by the input unit; and a display unit for displaying the operation characteristic determined by the calculation unit.

8 Claims, 4 Drawing Sheets

LOAD CURRENT 5,627,713

1

PROTECTIVE DEVICE FOR ELECTRIC DISTRIBUTION SYSTEM

This application is a continuation of application Ser. No. 07/675,814, filed on Mar. 27, 1991, now abandoned.

BACKGROUND OF THE INVENTION

1. Field of the Invention

The present invention relates to a protective device for preventing an accidental breakdown in an electric distribution system and a damaging of motor devices connected to the system.

2. Description of the Background Art

In an electric distribution system, a circuit breaker and a protective device are provided at each branch point of the system such that in case trouble occurs in the system, the trouble can be detected by the protective device and a disabled part can be disconnected selectively by the circuit breaker activated by the protective device, while still connecting as many of the other normally functioning parts of the system as possible. In order to be able to selectively disconnect the disabled part at the minimum interval, it is necessary to set the operation characteristics of the protective device appropriately.

Usually, this setting of the operation characteristics of the protective device is manually carried out by using a combination of ON/OFF switches, so that the errors may very well be occurring in the setting. For this reason, the inspection and confirmation of the correct setting is indispensable for the protective device.

In inspecting the setting in a conventional protective device, either the switches are inspected by human eyes, or the test of the overloading characteristic of the protective device is carried out.

In such a conventional protective device, when the human eye inspection is adopted the confirmation in a form of the overloading characteristic test cannot be obtained, while when the overloading characteristic test is adopted a large amount of current is necessary and a configuration inevitably becomes more complicated, both of which contributes to a higher cost for the operation.

SUMMARY OF THE INVENTION

It is therefore an object of the present invention to provide a protective device for an electric distribution system capable of providing an easy inspection and confirmation of the setting for the operation characteristics of the device.

This object is achieved in the present invention by providing a protective device for an electric distribution system in which a circuit breaker is provided between a main distribution bus line and a motor device connected to the main distribution bus line, the protective device comprising: input means for entering a setting of an operation characteristic of the protective device; means for determining the operation characteristic of the protective device according to the setting entered by the input means; and display means for displaying the operation characteristic determined by the determining means.

Other features and advantages of the present invention will become apparent from the following description taken in conjunction with the accompanying drawings.

2

Figure 1:
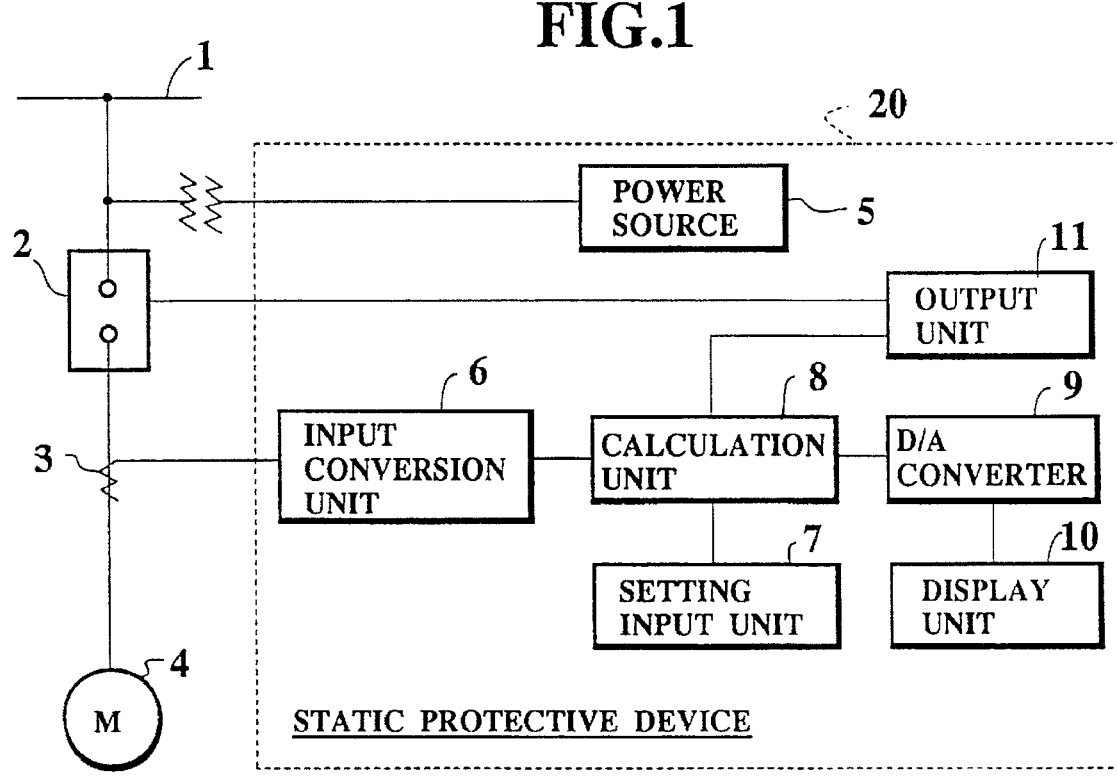
FIG. 1 is a block diagram of one embodiment of a protective device for an electric distribution system according to the present invention.
Figure 2:
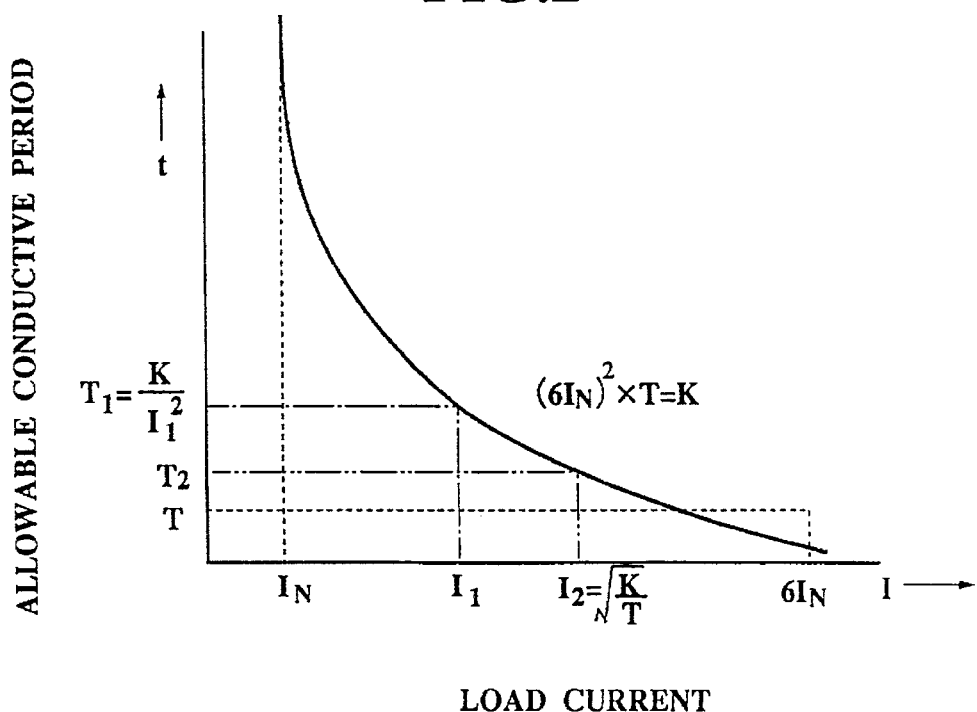

FIG. 2 is an example of a display by a display unit in the protective device of FIG. 1, which indicates the overload characteristic of the motor along with the overload characteristic of the protective device.

Figure 3:
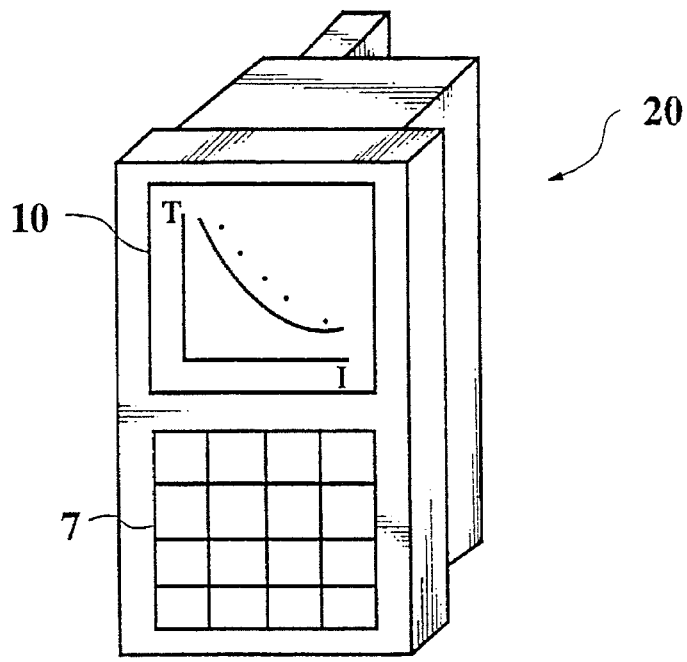

FIG. 3 is an example of an outward appearance of the protective device of FIG. 1.

Figure 4:
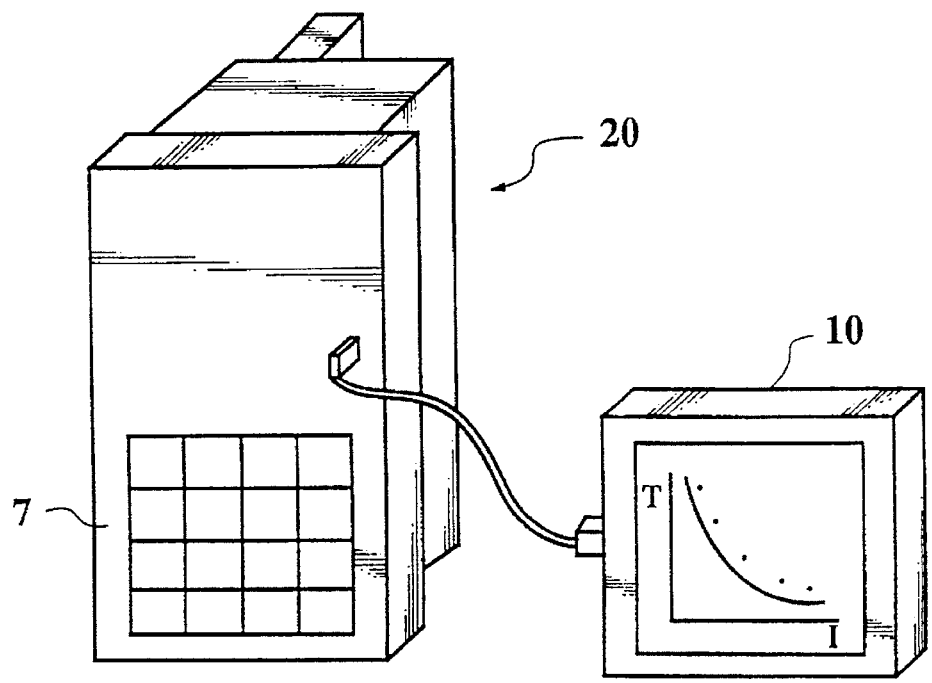

FIG. 4 is another example of an outward appearance of the protective device of FIG. 1.

Figure 5:
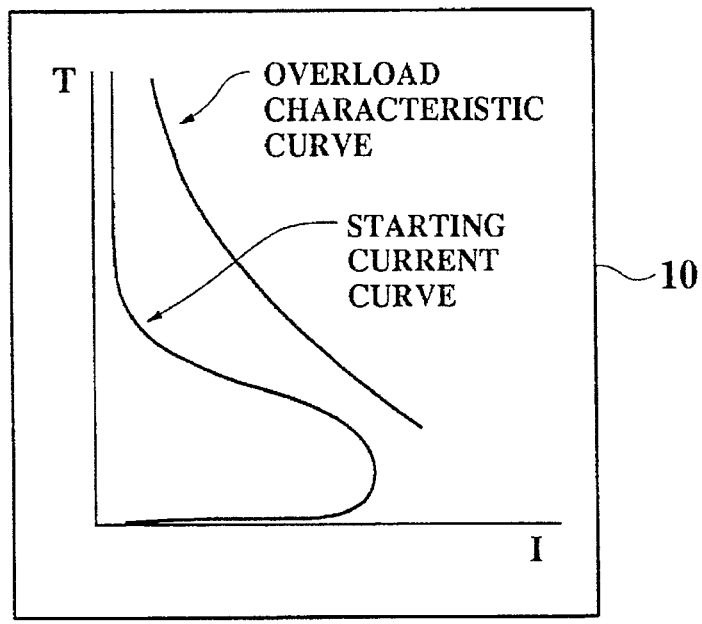

FIG. 5 is another example of a display by a display unit in the protective device of FIG. 1, which indicates the I-T curve for the starting current of the motor along with the overload characteristic of the protective device.

Figure 6:
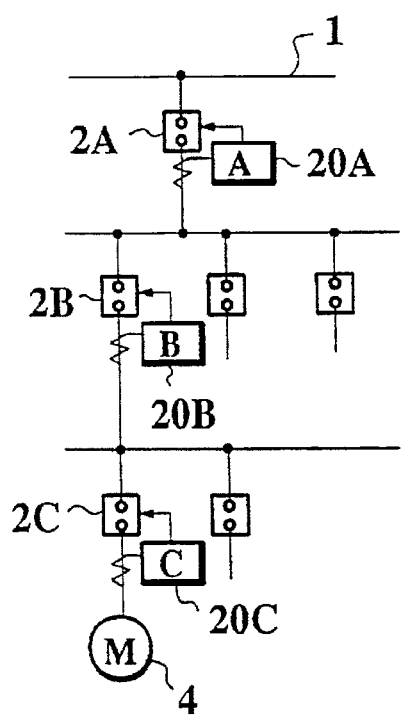

FIG. 6 is a schematic block diagram of an electric distribution system involving a cascade arrangement to which the protective device of FIG. 1 is to be used.

Figure 7:
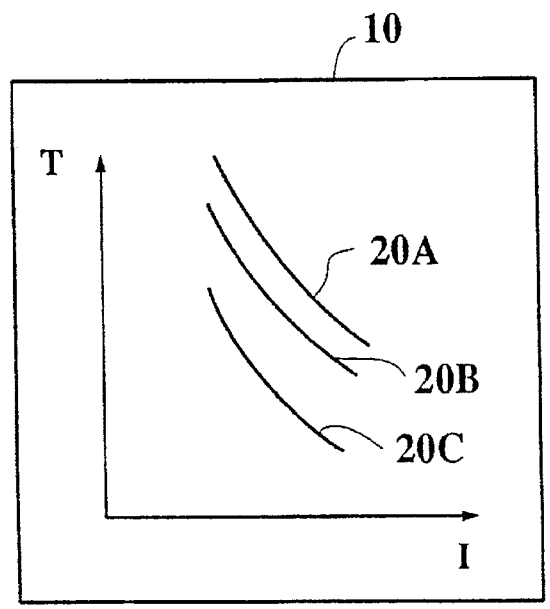

FIG. 7 is an example of a display by a display unit in the protective device of FIG. 1 used in the electric distribution system of FIG. 6, which indicates the overcurrent characteristics of the related protective devices together.

Figure 8:
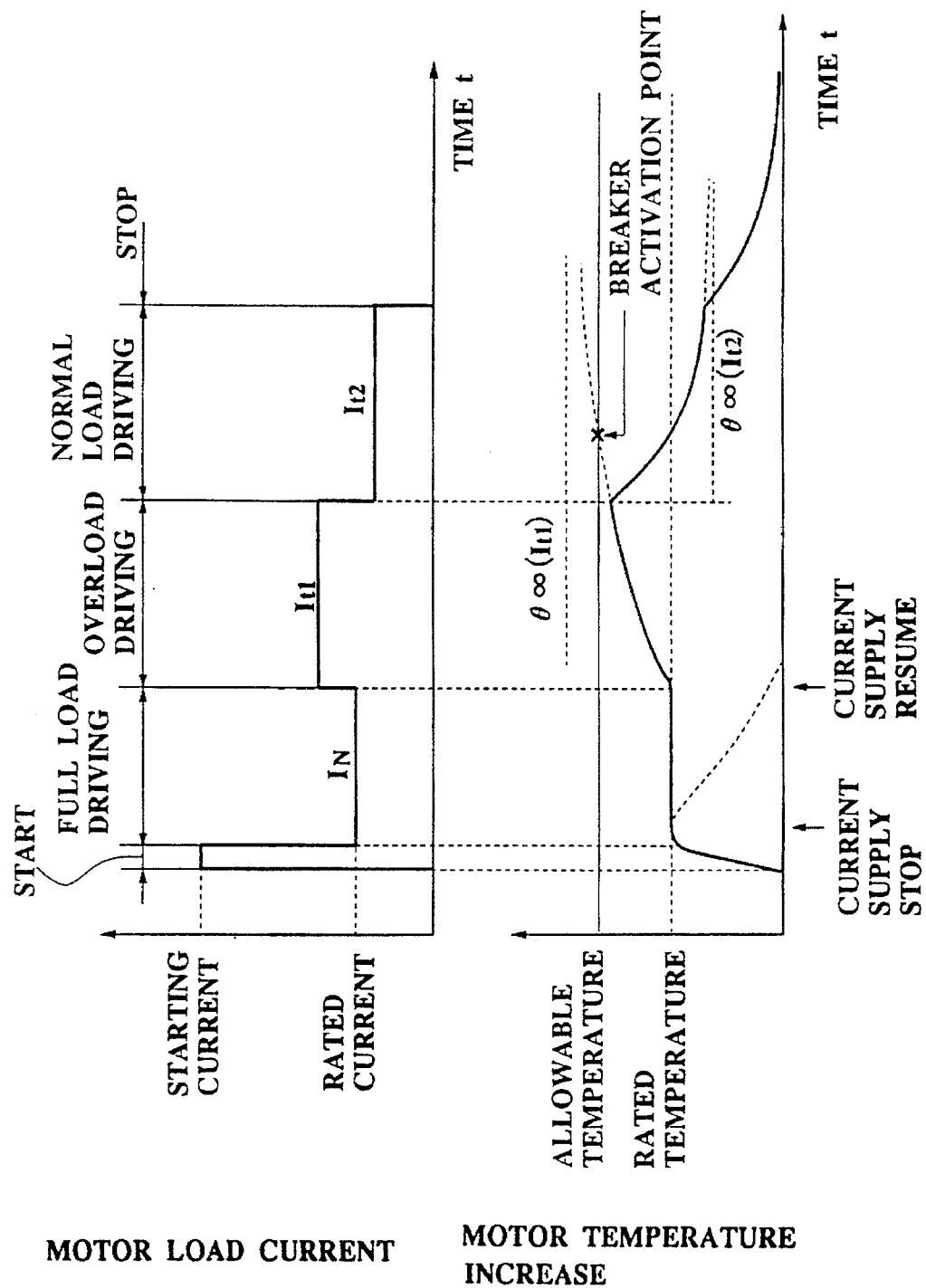

FIG. 8 is a graph for explaining an operation of a temperature calculation relay that can be used in the protective device of FIG. 1, which indicates the temperature increase characteristic.

DETAILED DESCRIPTION OF THE PREFERRED EMBODIMENTS

Referring now to FIG. 1, one embodiment of a protective device for an electric distribution system according to the present invention will be described in detail.

In this embodiment, a system includes a main distribution bus line 1, a motor 4 connected to the main distribution bus line 1, a circuit breaker 2 connected between the main distribution bus line 1 and the motor 4, and a static protective device 20 for activating the circuit breaker 2 in a case of current overflow which is connected between the circuit breaker 2 and the motor 4 through a current transformer 3 for detecting a load current flowing into the motor 4 from the main distribution bus line 1.

The static protective device 20 comprises: a power source 5 which receives the electric power supply from the main distribution bus line 1 and provides the power for operating the static protective device 20; an input conversion circuit 6 for converting the load current detected by the current transformer 3 into a corresponding digital signal; a setting input unit 7 for entering a setting for an overload characteristic of the static protective device 20 according to the overload characteristic of the motor 4 specified by an operator in terms of allowable conductive periods T for cases of using an arbitrary current between a range of a rated current $I_N$ and a starting current which is usually set equal to six times the rated current $I_N$; a calculation unit 8 for calculating the overload characteristic of the static protective device 20 in accordance with the setting at the setting input unit 7, and for generating a trip signal when the conductive period of the load current indicated by the digital signal from the input conversion unit 6 exceeds the allowable conductive period for that load current given by the calculated overload characteristic; a D/A converter 9 for converting the overload characteristic of the static protective device 20 obtained by the calculation unit 8 into a corresponding analog signal; a display unit 10 for displaying the overload characteristic of the static protective device 20 according to the analog signal obtained by the D/A converter 9; and an output unit 11 for outputting a break signal for activating the circuit breaker 2 to disconnect the motor 4 from the main distribution bus line 1 in response to the trip signal generated by the calculation unit 8.

The calculation unit 8 calculates the overload characteristic of the static protective device 20 as follows. Namely, the energy K passing through the static protective device 20 is a constant given by $K=(6\ I_N)^2 \times T$, so that, as shown in a graph of FIG. 2, the allowable conductive period $T_1$ for an arbitrary load current $I_1$ in a range between the rated current $I_N$ and the starting current $6\ I_N$ can be given as $T_1 = K/I_1^2$, and the load current $I_2$ for an arbitrary allowable conductive period $T_2$ which is longer than the shortest allowable conductive period T can be given as $I_2 = \sqrt{K/T_2}$. Here, the setting at the setting input unit 7 is to be done such that the allowable conductive period for a particular load current is shorter for the static protective device 20 indicated in FIG. 2 by a solid curve than for the motor 4 indicated in FIG. 2 by dots.

The display unit 10 displays the setting of the overload characteristic of the static protective device as shown in FIG. 2, along with the overload characteristic of the motor 4, for the sake of the visual inspection by the operator. Namely, after entering the setting for the overload characteristic at the setting input unit 7, the operator is required to check and confirm that the allowable conductive period for a particular load current is shorter for the static protective device 20 indicated in FIG. 2 by a solid curve than for the motor 4 indicated in FIG. 2 by dots. When the allowable conductive period for a particular load current is longer for the static protective device 20 than for the motor 4, the calculation unit 8 does not generate the trip signal even when the overloading of the motor 4 occurs, so that the setting is judged to be inappropriate. When the setting is found to be inappropriate by this inspection, a new setting is required to be entered at the setting input unit 7.

This static protective device 20 can be constructed into an appearance shown in FIG. 3 in which the setting input unit 7 in a form of a keyboard is located below the display unit 10 in a form of a display screen on a front side of the device, or an appearance shown in FIG. 4 in which the setting input unit 7 in a form of a keyboard is located on a front side of the device while the display unit 10 in a form of a separate display screen is attached to the device through a connection code.

Thus, according to this embodiment, the setting of the overload characteristic of the static protective device 20 is displayed on a display screen as the setting is entered, so that the inspection and confirmation of the setting by the operator becomes extremely easier. Moreover, this visual inspection of the setting by the operator can also be made more accurate by displaying the overload characteristic of the motor 4 along with the overload characteristic of the static protective device 20, such that safer operation of the electric distribution system can be achieved.

It is to be noted that, in addition, the display unit 10 may also display an I-T curve for a starting current of the motor 4 along with the overload characteristic of the static protective device 20.

Namely, as shown in FIG. 5, measuring a conduction time of the motor 4 from a time at which the load current changes from 0 to over the rated current $I_N$, an I-T curve of the load current of the motor 4 versus the conduction time can also be displayed on the display unit 10. This I-T curve for the starting current of the motor 4 can be utilized by the operator in inspecting the setting of the overload characteristic of the static protective device 20 in such a manner that when the overload characteristic curve intersect with the starting current curve, it implies that the calculation unit 8 does generate the trip signal even when the starting current necessary for activating the motor 4 is not yet supplied to the motor 4, so that the setting is judged to be inappropriate, and a new setting is required to be entered at the setting input unit 7.

Furthermore, when the electric distribution system involves a cascade arrangement shown in FIG. 6 in which a plurality of branchings are involved between the main distribution bus line 1 and the motor 4, so that a plurality of the circuit breakers 2A, 2B, and 2C and a plurality of the static protective devices 20A, 20B, and 20C are attached between the main distribution bus line 1 and the motor 4, it is necessary to make a setting of the overcurrent characteristics for these static protective devices 20 such that, as shown in FIG. 7, the setting for the static protective device of the superior location is to be higher than the setting for the static protective device of the inferior location. Thus, the setting for the static protective device 20A which is closest to the main distribution bus line 1 is set higher than that the setting for the static protective device 20B, and the setting for the static protective device 20B is set higher than the setting for the static protective device 20C which is closest to the motor 4.

Such a setting of the overcurrent characteristics for a plurality of static protective devices can be made easier by displaying the overcurrent characteristic curves for all the pertinent static protective devices as shown in FIG. 7 on the display unit 10 in the above embodiment.

It is also to be noted that although the above embodiment has been described for a case of using the overload characteristic as the operation characteristic to be set up, the present invention is also applicable to the other types of protective devices such as a temperature calculation relay device which uses the temperature increase characteristic as the operation characteristic.

In the temperature calculation relay device, the temperature increase characteristic of the motor 4 is set up as shown in FIG. 8 where the relationship between the load current of the motor 4 and the temperature increase is indicated. In FIG. 8, in a case of driving the motor 4, the temperature increase $\theta_1(t)$ at a time t is given by:

$$\theta_1(t) = \theta_\infty(It) \cdot (1 - e^{-t/TR})$$

where $\theta_{2s}(It)$ is a saturation temperature increase for a case the load current (It) has supplied continuously, and TR is a heating time constant of the motor 4. On the other hand, in a case of stopping the motor 4, the temperature increase $\theta_2(t)$ at a time t is given by:

$$\theta_2(t) = \theta(0) \cdot e^{-t/TD}$$

where $\theta(0)$ is a temperature increase at a time the motor 4 stopped, and TD is a heat releasing time constant of the motor 4.

In this temperature increase calculation relay, the trip signal is generated when $\theta_1(t)$ reaches the maximum allowable temperature $\theta_{SM}$, so that the relationship between the load current I and the conductive period t is given by:

$$t = -TR \cdot \ln\left(1 - \left(\frac{\theta_{SM}}{\theta_{SN}}\right)\left(\frac{I_N}{I}\right)^2\right)$$

where $\theta_{SN}$ is a temperature increase for a case the rated load current $I_N$ has supplied continuously.

Thus, in this temperature calculation relay device, four values of $I_N$, TR, $\theta_{SM}$, and $\theta_{SN}$ have to be specified at the setting input unit 7, and in response to the specified values the calculation unit 8 calculates the I-T curve according to the above equations, which can be shown on the display unit 10 for the inspection by the operator, just as in the case of the embodiment described above.

Besides these, many modifications and variations of the above embodiments may be made without departing from the novel and advantageous features of the present invention. Accordingly, all such modifications and variations are intended to be included within the scope of the appended claims.

What is claimed is:

1. A protective device for an electric distribution system in which a circuit breaker is provided between a main distribution bus line and a motor device connected to the main distribution bus line, the protective device comprising:

input means for entering a setting of an operation characteristic of the protective device according to an operation characteristic of the motor device;

means for determining the operation characteristic of the protective device according to the setting entered by the input means; and display means for displaying the operation characteristic determined by the determining means in a form of an I-T curve graph along with the operation characteristic of the motor device, in order to facilitate a visual inspection of an appropriateness of the setting entered at the input means.

2. The protective device of the claim 1, wherein the setting is entered at the input means by specifying the operation characteristic of the motor device.

3. The protective device of the claim 1, wherein the operational characteristic is an overload characteristic.

4. The protective device of the claim 3, wherein the determining means determines the overload characteristic such that an energy passing through the protective device becomes constant.

5. The protective device of the claim 1, wherein the display means also displays an I-T curve for a starting current of the motor device along with the operational characteristic of the protective device.

6. The protective device of the claim 1, wherein the electric distribution system has a cascade arrangement which includes a plurality of branchings, where each branching has one protective device provided, and wherein the display means also displays the operational characteristics of other protective devices related through the branchings.

7. The protective device of the claim 1, wherein the operational characteristic is a temperature increase characteristic.

8. The protective device of the claim 1, further comprising:

detector means for detecting a load current supplied to the motor device; and means for generating a trip signal to activate the circuit breaker when an operation of the motor device indicated by the load current detected by the detector means is not in compliance with the operational characteristic of the protective device determined by the determining means.

* * * * *